United States Patent
Hong

(10) Patent No.: US 12,543,053 B2
(45) Date of Patent: Feb. 3, 2026

(54) COMMUNICATION METHOD, DEVICE AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 458 days.

(21) Appl. No.: 18/027,786

(22) PCT Filed: Sep. 25, 2020

(86) PCT No.: PCT/CN2020/117948
§ 371 (c)(1),
(2) Date: Mar. 22, 2023

(87) PCT Pub. No.: WO2022/061789
PCT Pub. Date: Mar. 31, 2022

(65) Prior Publication Data
US 2023/0337015 A1    Oct. 19, 2023

(51) Int. Cl.
*H04W 24/02* (2009.01)
(52) U.S. Cl.
CPC .................... *H04W 24/02* (2013.01)
(58) Field of Classification Search
None
See application file for complete search history.

(56) References Cited

U.S. PATENT DOCUMENTS

2017/0231028 A1* 8/2017 Kim ................... H04W 76/18
2021/0345152 A1* 11/2021 Kimba Dit Adamou ...................
H04W 24/10

FOREIGN PATENT DOCUMENTS

| CN | 110622534 A | 12/2019 |
| CN | 110771196 A | 2/2020 |
| CN | 111314931 A | 6/2020 |
| WO | WO 2020147819 A1 | 7/2020 |

OTHER PUBLICATIONS

Samsung "On Supporting NR MDT" 3GPP TSG-RAN WG2#105, R2-1901007, Feb.-Mar. 2019, 3 pages.
European Patent Application No. 20954641.5, Search and Opinion dated Apr. 30, 2024, 12 pages.
PCT/CN2020/117948, English translation of Search Report dated Jun. 23, 2021, 2 pages.

* cited by examiner

*Primary Examiner* — Walter J Divito
(74) *Attorney, Agent, or Firm* — Cozen O'Connor

(57) ABSTRACT

A communication method includes: receiving, from a first network device, minimization of drive tests (MDT) configuration information for a multi-card terminal device; and in response to the multi-card terminal device entering an idle state from a connected state, performing MDT measurement based on the MDT configuration information, and storing obtained MDT measurement information.

16 Claims, 6 Drawing Sheets

COMMUNICATION METHOD, DEVICE AND STORAGE MEDIUM

CROSS-REFERENCE TO RELATED APPLICATION

This application is a U.S. national phase of International Application No. PCT/CN2020/117948, filed on Sep. 25, 2020, the entire content of which is incorporated herein by reference.

TECHNICAL FIELD

The disclosure relates to the field of communication technology, in particular to a communication method, a communication apparatus, a device, and a storage medium.

BACKGROUND

With the development of communication technology, the number of multi-card terminal devices in the market is increasing. Currently, the terminal device manufacturers decide on the communication modes of the multi-card terminal devices, and thus different multi-card terminal devices made by different manufacturers have different communication modes. Take cell phones as an example, the communication modes of cell phones include dual card single standby, dual card dual standby single active, and dual card dual standby dual active.

SUMMARY

According to a first aspect of embodiments of the disclosure, a communication method, performed by a multi-card terminal device, is provided. The method includes:
  receiving Minimization of Drive-Test (MDT) configuration information for the multi-card terminal device sent by a first network device; and
  in response to the multi-card terminal device entering an idle state from a connected state, performing MDT measurement based on the MDT configuration information, and storing obtained MDT measurement information.

According to a second aspect of embodiments of the disclosure, a communication method, performed by a network device, is provided. The method includes:
  sending MDT configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information.

According to a third aspect of embodiments of the disclosure, a communication method, performed by a network device, is provided. The method includes:
  receiving MDT measurement information sent by a multi-card terminal device and stored in an idle state.

According to a fourth aspect of embodiments of the disclosure, a multi-card terminal device is provided. The multi-card terminal device includes a processor and a memory, wherein the processor and the memory are interconnected;
  the memory is configured to store computer programs; and
  the processor is configured to implement the method provided in any possible implementations in the first aspect when calling the computer programs.

According to a fifth aspect of embodiments of the disclosure, a network device is provided. The network device includes a processor and a memory, wherein the processor and the memory are interconnected;
  the memory is configured to store computer programs; and
  the processor is configured to implement the method provided in the second aspect and/or the third aspect, when calling the computer programs.

According to a sixth aspect of embodiments of the disclosure, the embodiments of the disclosure provide a computer-readable storage medium having computer programs stored thereon, wherein when the computer programs are executed by a processor, the method of the first aspect, the second aspect and/or the third aspect of the disclosure is implemented.

BRIEF DESCRIPTION OF THE DRAWINGS

In order to clearly illustrate technical solutions of embodiments of the disclosure, a brief description of drawings used in embodiments is given below. The drawings in the following descriptions are only part embodiments of the disclosure, and for those skilled in the art, other drawings can be obtained according to these drawings without inventive works.

DETAILED DESCRIPTION

The technical solutions in the embodiments of the disclosure will be clearly and completely described below with reference to the accompanying drawings in the embodiments of the disclosure. The embodiments described are only a part of the embodiments of the disclosure, and not all of the embodiments. Based on the embodiments of the disclosure, all other embodiments obtained by those skilled in the art without inventive works fall within the scope of protection of the disclosure.

Since the multi-card terminal device includes multiple Subscriber Identity Module (SIM) cards, some potential communication problems may occur. For example, the paging moments of different SIM cards may overlap, so that the multi-card terminal device cannot receive or misses the paging signaling, and thus the corresponding service cannot be established.

Therefore, effectively solving the communication problems caused by the multiple SIM cards in the multi-card terminal device has become an important topic in the field.

Embodiments of the disclosure provides a communication method, a communication apparatus, a device, and a storage medium, to improve communication quality of the multi-card terminal device and to improve communication efficiency.

Figure 1A:
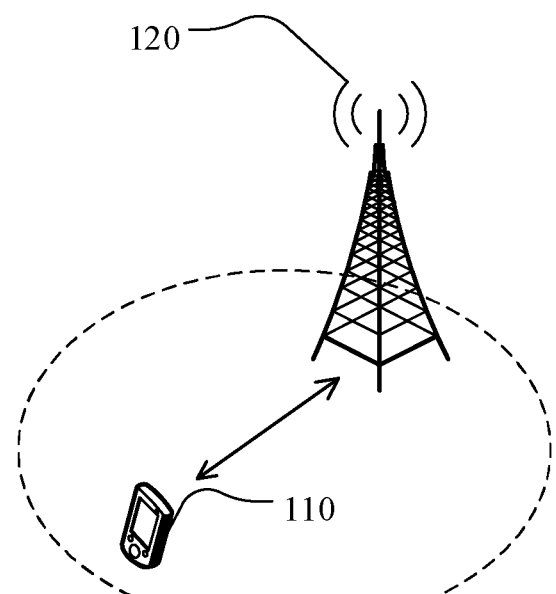
FIG. 1a is a schematic diagram of a network structure according to an embodiment of the disclosure.

FIG. 1a is a schematic diagram of a network structure according to an embodiment of the disclosure. In FIG. 1a, a network device 120 may send Minimization of Drive-Test (MDT) configuration information to a terminal device 110 within its coverage area, and the terminal device 110 may, in response to entering an idle state or an inactive state from a connected state, perform MDT measurement based on the received MDT configuration information and store obtained MDT measurement information.

Alternatively, the terminal device 110 may, in response to entering the idle state or the inactive state, perform the MDT measurement based on the received MDT configuration information and store the obtained MDT measurement information.

Alternatively, the terminal device 110 may, in response to entering the idle state or the inactive state, perform the MDT measurement based on the received MDT configuration information, to determine the MDT measurement information. The terminal device 110 is a device including multiple Subscriber Identity Module (SIM) cards, and the above MDT configuration information is MDT configuration information for a multi-card terminal device, i.e., the terminal device 110 may perform the MDT measurement for each SIM card of the multi-card terminal device separately based on the MDT configuration information.

Further, the terminal device 110 may send the MDT measurement information obtained in the idle state or the inactive state based on the MDT configuration information to a corresponding network device in its coverage area, so that the corresponding network device sends communication configuration information to the terminal device. Then, the terminal device 110 may perform communication based on the communication configuration information.

In some embodiments, the terminal device 110 may store the MDT measurement information obtained in the idle state or the inactive state based on the MDT configuration information.

Figure 1B:
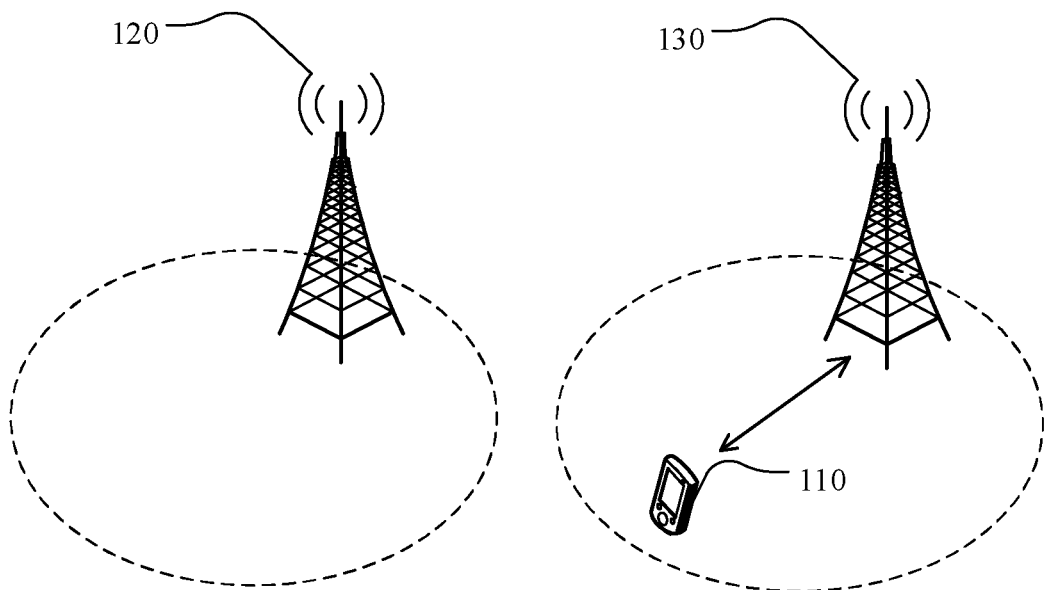
FIG. 1b is a schematic diagram of a network structure according to another embodiment of the disclosure.

FIG. 1b is a schematic diagram of a network structure according to another embodiment of the disclosure. As shown in FIG. 1b, the terminal device 110 moves from a coverage area of a network device 120 to a coverage area of a network device 130. In this case, the network device 130 may receive the MDT measurement information stored in the idle state and sent by the terminal device 110, and then send communication configuration information to the terminal device 110 based on the received MDT measurement information, to instruct the terminal device 110 to communicate with a multi-card terminal device based on the communication configuration information.

The network structure provided by the embodiments of the disclosure may be used in various communication systems, such as, a Global System of Mobile communication (GSM) system, a Code Division Multiple Access (CDMA) system, a Wideband Code Division Multiple Access (WCDMA) General Packet Radio Service (GPRS) system, a Long Term Evolution (LTE) system, a LTE Frequency Division Duplex (FDD) system, a LTE Time Division Duplex (TDD) system, a Long Term Evolution Advanced (LTE-A) system, an Universal Mobile Telecommunication System (UMTS), a Worldwide Interoperability for Microwave Access (WiMAX) system, a third Generation Partnership Project (3GPP) related cellular system, a 4th generation (4G) mobile communication system, a 5th generation (5G) mobile communication system, and subsequently evolved communication systems. 5G includes New Radio (NR).

The terminal device 110 in an embodiment of the disclosure may be a multi-SIM device that provides voice and/or data connectivity to a user, a handheld multi-SIM device having wireless connection function, or other processing devices supporting multiple SIM cards and connected to a wireless modem, and a multi-SIM terminal in a future 5G system or a terminal device supporting multiple SIM cards in a future evolved Public Land Mobile Network (PLMN). The name of the terminal device may be different in different systems. For example, in the 5G system, the terminal device may be called a User Equipment (UE), which may be a wireless terminal device communicating with one or more Core Networks (CNs) via a Radio Access Network (RAN) and supporting multiple SIM cards. The wireless terminal device may be mobile terminal devices, such as mobile phones (also called "cellular" phones) and computers with mobile terminal devices, such as, portable, pocket-sized, handheld, computer built-in, or in-vehicle mobile devices, for exchanging language and/or data with the RAN. For example, it may be a Personal Communication Service (PSC) phone, a cordless phone, a Session Initiated Protocol (SIP) phone, a Wireless Local Loop (WLL) station, or a Personal Digital Assistant (PDA), which is not limited in embodiments of the disclosure. The wireless terminal device may be called as a system, a subscriber unit, a subscriber station, a mobile station, a mobile, a remote station, an access point, a remote terminal, an access terminal, a user terminal, a user agent, or a user device, which is not limited in embodiments of the disclosure.

The network device 120 and the network device 130 in the embodiment of the disclosure may be a base station, which may include a plurality of cells that provide service to user devices. Depending on specific application occasions, the base station may be referred to as an access point, a device, in an access network, that communicates with a wireless terminal device through one or more sectors on a radio interface, or other names. The network device may be used to interchange received air frames with Internet Protocol (IP) packets, acting as a router between the wireless terminal device and the remaining parts of the access network, and the remaining parts of the access network may include an IP communication network. The network device may also coordinate the management of attributes of the air interface.

For example, the network device 120 and the network device 130 in the embodiments of the disclosure can be a Base Transceiver Station (BTS) in the GSM system or CDMA system, a NodeB in the WCDMA system, an evolutional Node B (i.e., eNB or e-NodeB) in the LTE system, a 5G base station (gNB) in the next generation system, a Home evolved Node B (HeNB), a relay node, a femto, a pico, which is not limited in the embodiments of the disclosure. In some network structures, the network device 120 and the network device 130 in the embodiments of the disclosure may include a Centralized Unit (CU) node and a Distributed Unit (DU) node, and the CU and the DU may be geographically separated.

Figure 2A:
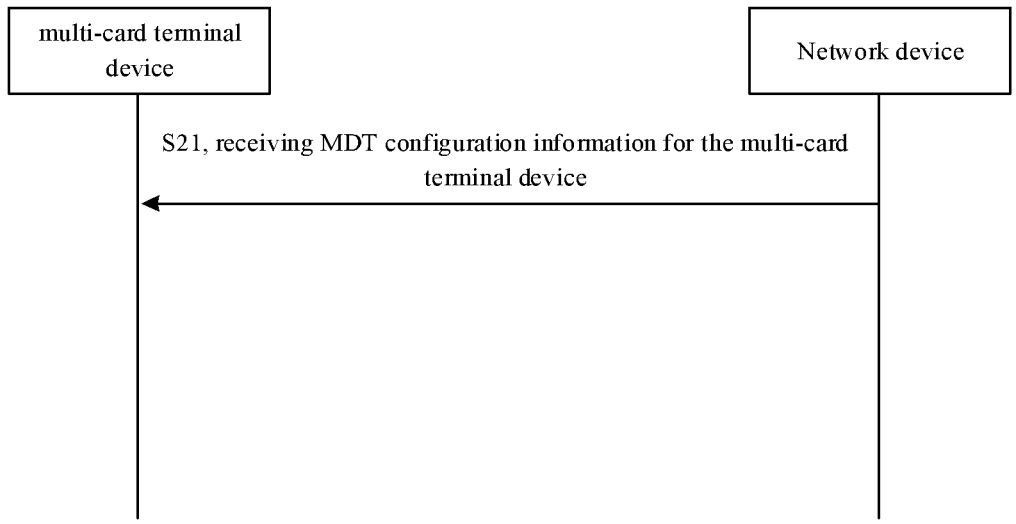
FIG. 2a is a sequence diagram of a communication method according to an embodiment of the disclosure.

FIG. 2a is a sequence diagram of a communication method according to an embodiment of the disclosure. As shown in FIG. 2a, the communication method according to the embodiment of the disclosure includes the following steps.

At step S21, a multi-card terminal device receives MDT configuration information for the multi-card terminal device.

In some possible implementations, the multi-card terminal device receives the MDT configuration information sent by a network device in a connected state or an inactive state to perform MDT measurement in an idle state based on the MDT configuration information. In other possible implementations, the multi-card terminal device receives the MDT configuration information sent by the network device in the connected state to perform the MDT measurement in the idle state or in the inactive state based on the MDT configuration information.

In all the embodiments of the disclosure, step S21 may be performed alone as a method of transmitting the MDT configuration information. In all the embodiments of the disclosure, step S21 may be performed in combination with any of other steps.

In detail, the MDT configuration information includes MDT configuration information corresponding to at least one SIM card, i.e., the network device may send the MDT configuration information corresponding to the at least one SIM card to the multi-card terminal device, to instruct the multi-card terminal device to perform the MDT measurement for each SIM card based on the MDT configuration information corresponding to each SIM card.

Optionally, the MDT configuration information corresponding to each SIM card in the multi-card terminal device may be sent by different network devices. For example, when the multi-card terminal device includes the first SIM card and the second SIM card, a first network device may send MDT configuration information corresponding to the first SIM card to the multi-card terminal device, and a second network device sends MDT configuration information corresponding to the second SIM card to the multi-card terminal device, which is not limited in the disclosure. The first network device and the second network device may be the same network side device or different network side devices.

The first network device sends the MDT configuration information corresponding to the first SIM card to the multi-card terminal device, and the second network device may send the MDT configuration information corresponding to the second SIM card to the multi-card terminal device. Alternatively, the first network device and the second network device may send the MDT configuration information of the corresponding SIM cards to the multi-card terminal device at different times, which may be determined based on the actual application scenario and is not limited herein. The first network device and the second network device may be the same network side device or different network side devices.

Any network device can send the MDT configuration information to the multi-card terminal via any signaling. In some embodiments, any network device may send the MDT configuration information to the multi-card terminal device via a LoggedMeasurementConfiguration signaling.

In some possible implementations, the MDT configuration information corresponding to each SIM card may be the same or different. In some embodiments, the MDT configuration information corresponding to each SIM card may include any of the following parameters: an item for MDT measurement, an event type that triggers storage of MDT, information to be measured, or measurement time. The MDT configuration information may also include other parameters. In embodiments of the disclosure, the MDT configuration information corresponding to each SIM card may be determined specifically based on the actual application scenario, which is not limited in embodiments of the disclosure.

Optionally, the item for MDT measurement includes at least one of paging collision, paging unresponsiveness, or a service type of unresponsiveness, which can be determined based on the actual application scenario and is not limited herein. For example, the item for MDT measurement may be used to instruct the multi-card terminal device to measure communication information related to paging collision between multiple SIM cards, paging unresponsiveness, or an unresponsive service type of a particular SIM during the MDT measurement.

In some embodiments, the event type that triggers storage of MDT includes, but is not limited to, paging collision, paging unresponsiveness, and a service type of unresponsiveness, which may be determined based on the actual application scenario and is not limited herein. The event type that triggers storage of MDT can trigger the multi-card terminal device to perform the MDT measurement to determine the MDT measurement information, and store the determined MDT measurement information. That is, the multi-card terminal device triggers the multi-card device to perform the MDT measurement to determine the MDT measurement information and store the MDT measurement information when paging collision between multiple SIM cards or paging unresponsiveness occurs, or a particular SIM cannot respond to a service type event.

In some embodiments, the information to be measured includes, but is not limited to, Radio Access Type (RAT), frequency, a cell, and other relevant information such as the time of occurrence corresponding to each event type, which can be determined based on the actual application scenario and is not limited herein. For example, the information to be measured can be used to instruct the multi-card terminal device to measure the RAT, the frequency, the cell and other information of the multi-card terminal device during communication when performing the MDT measurement. The RAT includes but is not limited to GSM access technology, CDMA access technology and WCDMA access technology, which can be determined based on the actual application scenario and is not limited in the disclosure.

Optionally, the measurement time includes, but is not limited to, a measurement start time, a measurement end time, a measurement duration, and a measurement time interval, which may be determined based on the actual application scenario and is not limited herein. The measurement start time may be configured to indicate the time when the multi-card terminal device starts the MDT measurement. The measurement end time may be configured to indicate the time when the multi-card terminal device ends the MDT measurement. The measurement duration may be configured to indicate the duration of each MDT measurement performed by the multi-card terminal device. The measurement time interval may be configured to indicate a time interval between any two MDT measurements performed by the multi-card terminal device.

Figure 2B:
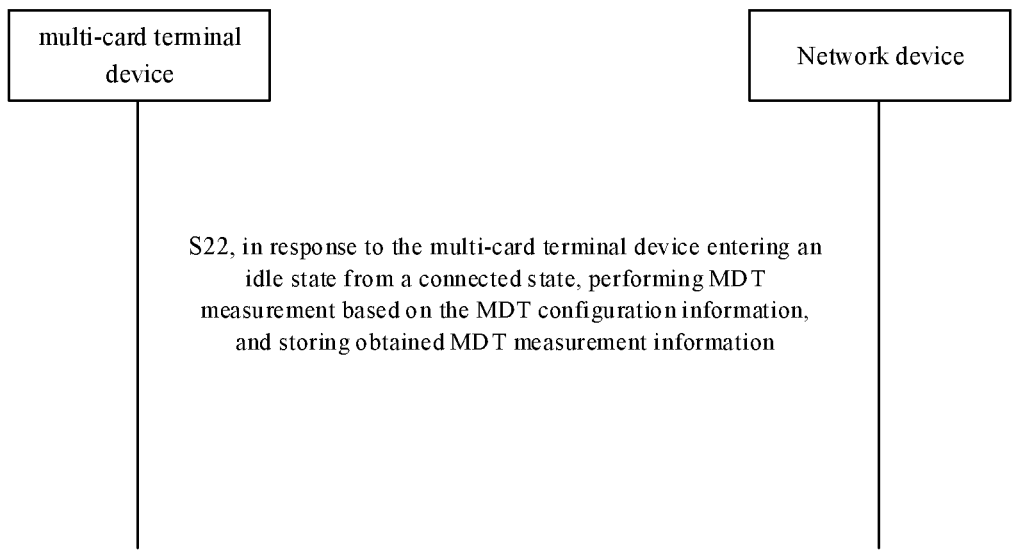
FIG. 2b is a sequence diagram of a communication method according to another embodiment of the disclosure.

FIG. 2b is a sequence diagram of a communication method according to an embodiment of the disclosure. As shown in FIG. 2b, the communication method includes the following steps.

At step S22, the multi-card terminal device, in response to entering an idle state or an inactive state from a connected state, performs MDT measurement based on MDT configuration information and stores obtained MDT measurement information.

In some possible implementations, the multi-card terminal device receives the MDT configuration information sent by the network device while in the connected state, and the multi-card terminal device, in response to entering the idle state from the connected state, performs the MDT measurement based on the MDT configuration information in the idle state, and stores the obtained MDT measurement information.

The multi-card terminal device may store the MDT measurement information corresponding to each SIM card in the corresponding SIM card, or store the MDT measurement information obtained by the measurement in a storage space corresponding to the multi-card terminal device, which is not limited here.

Optionally, the multi-card terminal device, in response to entering the idle state or the non-connected state from the connected state, performs the MDT measurements in the idle state or the non-connected state based on the MDT configuration information, to determine the MDT measurement information.

In some possible implementations, if the MDT configuration information includes the MDT configuration information corresponding to the at least one SIM card, the MDT measurement can be performed for each SIM card based on the MDT configuration information corresponding to the SIM card, and then the MDT measurement information corresponding to the SIM can be determined.

In detail, for each SIM card, if the configuration information corresponding to the SIM card includes only one of the item for MDT measurement, the event type triggering the storage of MDT, the information to be measured, and the measurement time, the multi-card terminal device may perform the MDT measurement based on the configuration information, to determine the MDT measurement information, and store the determined MDT measurement information.

For example, if the corresponding MDT configuration information for each SIM card includes only the event type that triggers the storage of MDT, the multi-card terminal device may be triggered to perform the MDT measurement for the SIM card when it detects the event type indicated by the MDT configuration information in the idle state such as paging collision or paging unresponsiveness occurring in the multi-card terminal device, and unresponsive service type. At this time, the multi-card terminal device can measure all the communication information of the multi-card terminal device or measure the communication information corresponding to the event type that triggers the MDT measurement, to determine the MDT measurement information and store the determined MDT measurement information, which can be determined based on the specific configuration of the multi-card terminal device or the specific instructions of the network device, which is not limited here.

For example, if the MDT configuration information for each SIM card includes only the item for MDT measurement, the multi-card terminal device may perform the MDT measurement for the item based on the specific item included in the MDT configuration information. If the paging collision or paging unresponsiveness of the SIM card occurs, or the unresponsive service type exists on the SIM card, the multi-card terminal device is triggered to perform the MDT measurement on the SIM card to obtain the communication information corresponding to the paging collision, the paging unresponsiveness, or the unresponsive service type existing on the SIM card, to determine the MDT measurement information and store the determined MDT measurement information. The communication information to be measured corresponding to each item can be determined based on the specific configuration of the multi-card terminal device or the specific instructions of the network device, which is not limited herein.

For example, when the MDT configuration information corresponding to each SIM card includes only the information to be measured, the multi-card terminal device, when performing MDT measurement, measures the RAT, frequency, a cell, and other information to be measured of the SIM card under all communication conditions, to obtain the MDT measurement information corresponding to the SIM card. The above communication conditions include, but are not limited to, abnormal communication conditions such as paging unresponsiveness of the SIM and the information to be measured under normal communication conditions, to determine the MDT measurement information.

For example, if the MDT configuration information corresponding to each SIM card includes only the measurement time, the multi-card terminal device performs the MDT measurement for all relevant information of the SIM card under all communication conditions based on the measurement time, and determines the MDT measurement information corresponding to the SIM.

Optionally, for each SIM card, if the MDT configuration information corresponding to the SIM card includes more than one of the item for MDT measurement, the event type that triggers storage of MDT, the information to be measured, and the measurement time, the multi-card terminal device may perform the MDT measurement based on the more than one items of configuration information included in the MDT configuration information, to determine the MDT measurement information and store the determined MDT measurement information.

For example, if the MDT configuration information corresponding to each SIM card includes the item for MDT measurement and the information to be measured, the multi-card terminal device, when performing the MDT measurement, may focus on the information to be measured in response to paging collision or paging unresponsiveness of the SIM card, or an unresponsive service type existing in the SIM, i.e., it measures the information to be measured, such as, the RTA and frequency corresponding to the above item, and then determines the MDT measurement information corresponding to the SIM.

For example, if the MDT configuration information corresponding to each SIM card includes the item for MDT measurement and the event type that triggers storage of MDT, the multi-card terminal device, in response to paging collision or paging unresponsiveness of the SIM card or an unresponsive service type existing in the SIM, performs the MDT measurement for each of the above event types to determine the corresponding MDT measurement information and stores the determined MDT measurement information.

For example, if the MDT configuration information corresponding to each SIM card includes the information to be measured and the measurement time, when the multi-card terminal device performs the MDT measurement in the idle state, it performs the measurement for each piece of the information to be measured based on the measurement time, and determines the corresponding MDT measurement information.

For example, if the MDT configuration information corresponding to each SIM card includes the item for MDT measurement, the event type that triggers storage of MDT, the information to be measured, and the measurement time, the multi-card terminal device, in response to paging collision or paging unresponsiveness of the SIM card or an unresponsive service type existing in the SIM, measures the information to be measured corresponding to each of the above event types based on the measurement time, determines the corresponding MDT measurement information, and stores the determined MDT measurement information.

Figure 2C:
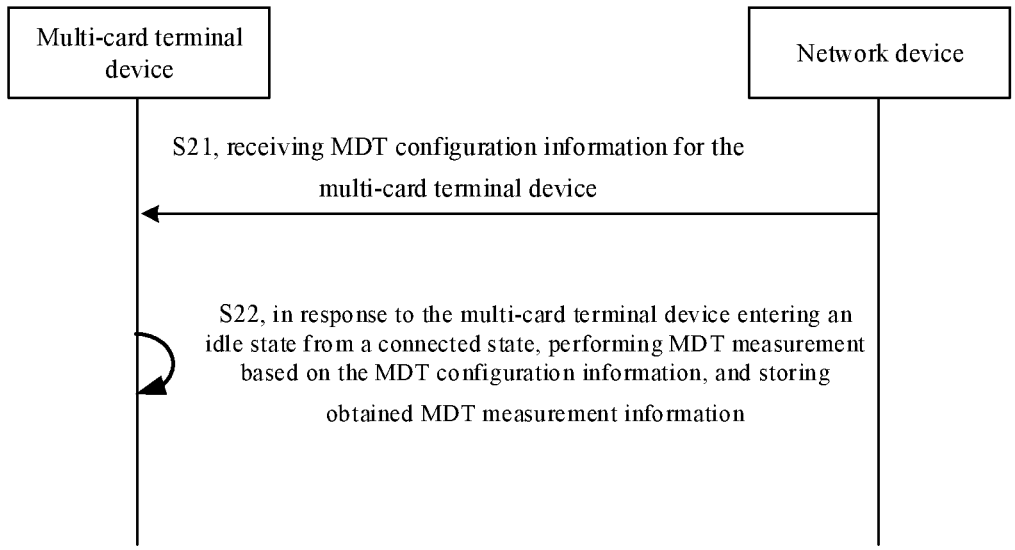
FIG. 2c is a sequence diagram of a communication method according to yet another embodiment of the disclosure.

FIG. 2c is a sequence diagram of a communication method according to an embodiment of the disclosure. As shown in FIG. 2c, the communication method includes the following steps.

At step S21, a multi-card terminal device receives MDT configuration information for the multi-card terminal device.

At step S22, in response to the multi-card terminal device entering an idle state or an inactive state from a connected state, the multi-card terminal device performs MDT measurement based on the MDT configuration information, and stores obtained MDT measurement information.

The specific technical details of step S21 and/or step S22 are as described in the preceding embodiments of FIG. 2a and/or FIG. 2b and will not be repeated herein.

Figure 3:
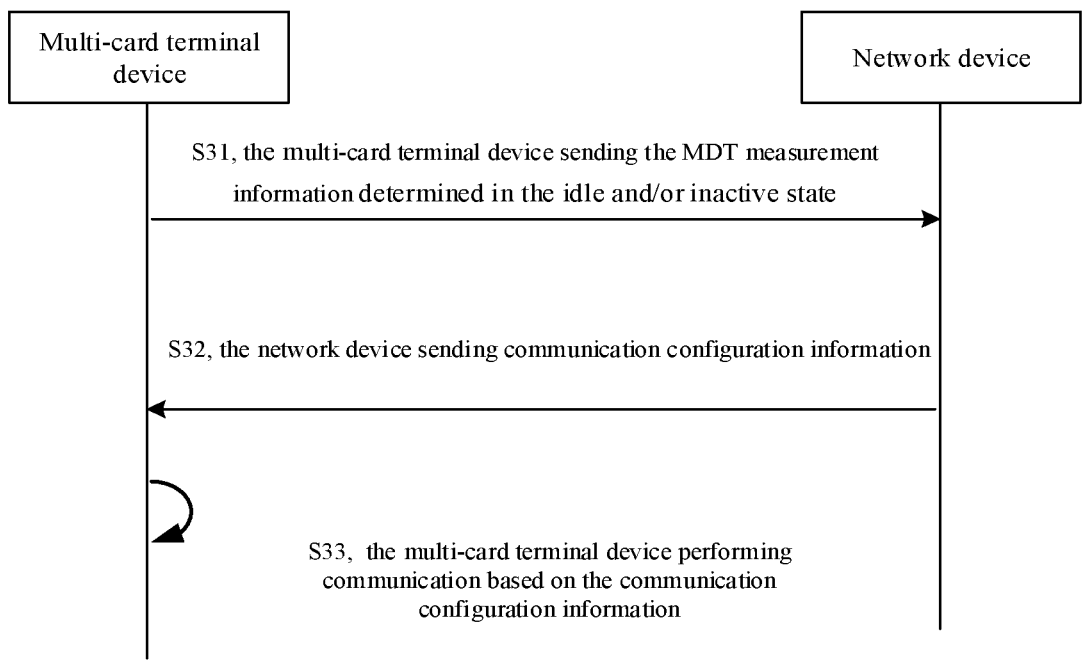
FIG. 3 is a sequence diagram of a communication method according to yet another embodiment of the disclosure.

FIG. 3 is a sequence diagram of a communication method according to an embodiment of the disclosure. In the embodiments of the disclosure, the embodiment as shown in FIG. 3 may be performed alone or in combination with other embodiments of the disclosure, which is not limited herein. As shown in FIG. 3, the communication method provided in the embodiments of the disclosure may include the following steps.

At step S31, the multi-card terminal device sends the MDT measurement information determined in an idle state and/or an inactive state.

In some possible implementations, after obtaining the MDT measurement information by performing the MDT measurement in the idle state, the multi-card terminal device may, in response to entering a connected state from the idle state, send the MDT measurement information measured and stored in the idle state to the network device while in the connected state.

Optionally, after performing the MDT measurement while in the idle state to determine the MDT measurement information, the multi-card terminal device may, in response to entering the connected state from the idle state, send the MDT measurement information determined in the idle state to the network device while in the connected state.

The network device (hereinafter referred to as a second network device for ease of description) that receives the MDT measurement information determined by the multi-card terminal device in the idle or inactive state and the network device (hereinafter referred to as a first network device for ease of description) that sends MDT configuration information determined by it in the idle or inactive state may be the same network device or different network devices depending on the actual application scenario, which is not limited herein. In this embodiment of the disclosure, after determining the MDT configuration information, the multi-card terminal device may store the determined MDT configuration information.

For example, the multi-card terminal device, within a coverage area of the first network device, receives the MDT configuration information sent by the first network device and performs the MDT measurement based on the MDT configuration information when in the idle state or the inactive state, to obtain the MDT measurement information. If the multi-card terminal device does not move, the multi-card terminal device may send the MDT measurement information determined in the idle state or the inactive state to the first network device. If the multi-card terminal moves out of the coverage area of the first network device and into a coverage area of the second network device, the multi-card terminal device may send the MDT measurement information determined in the idle state or the inactive state to the second network device.

At step S32, a network device sends communication configuration information.

In some possible implementations, the network device sends the communication configuration information to the multi-card terminal device, to resolve communication problems or issues of the multiple SIM cards of the multi-card terminal device. The communication problems or issues include but not limited to, problems or issues such as paging collision, paging unresponsiveness or an unresponsive service type, which may be determined based on the specific contents of the received MDT measurement information and are not limited herein.

In some embodiments of the disclosure, the network device may send corresponding communication configuration information to the multi-card terminal device based on the specific content of the received MDT measurement information. In other embodiments of the disclosure, the network device may send the corresponding communication configuration information to the multi-card terminal device based on a trigger event. In some embodiments of the disclosure, the network device may send the corresponding communication configuration information to the multi-card terminal device based on a communication protocol or preset configuration.

That is, the network device may send the corresponding communication configuration information to the multi-card terminal device based on the specific content of the received MDT measurement information, to enable the multi-card terminal to resolve the problems or issues such as paging collision, paging unresponsiveness or the unresponsive service type of the multi-card terminal device based on the communication configuration information.

For example, based on the MDT configuration information sent by a certain network device, the multi-card terminal device measures the MDT measurement information corresponding to a paging signaling and paging response time corresponding to each SIM card when paging collision occurs among the SIM cards in the multi-card terminal device. The network device can set paging offset time for the multi-card terminal device based on the MDT measurement information sent by the multi-card terminal device, i.e., the paging response time points of respective SIM cards for responding to the paging signaling are set to different time points. The specific setting information is sent, as the communication configuration information, to the multi-card terminal device, so that each SIM card of the multi-card terminal device responds to the corresponding paging signaling based on the paging offset time, thus solving the problem of paging collision caused by the multi-card terminal device.

For example, the MDT measurement information is information obtained by performing measurement for the unresponsive service type of the multi-card terminal device. For example, if a SIM card of the multi-card terminal device cannot respond to a short message service because it is responding to a calling service, the network device can set response priorities for the calling service and the short message service of the SIM card, so that the multi-card terminal device can respond based on the response priorities of the calling service and the short message service. When the multi-card terminal device faces the calling service and the short message service at the same time, it performs the calling service or the short message service first based on the response priorities, to avoid a situation of not being able to respond to a certain communication service.

At step 533, the multi-card terminal device performs communication based on the communication configuration information.

In some possible implementations, the multi-card terminal device may perform communication based on the specific configuration in the communication configuration information, such as monitoring paging, reading system messages, and responding to services based on the communication configuration information, which can be determined based on the specific contents of the communication configuration information and is not limited herein.

In some embodiments of the disclosure, the network device may instruct the multi-card terminal device to perform the MDT measurement in accordance with the instructions based on the MDT configuration information, to make the multi-card terminal device improve the efficiency of the MDT measurement. The network device may obtain some or all of the MDT measurement information sent by the multi-card terminal device, and then the multi-card terminal device may perform communication based on the communication configuration information sent, based on the some or all the MDT measurement information, by the network device, which may improve the communication quality of the multi-card terminal device and improve the communication efficiency.

In the embodiment of the disclosure, the above steps 31, 32, and 33 may be performed individually or in any combination, which is not limited in the embodiments of the disclosure.

Figure 4:
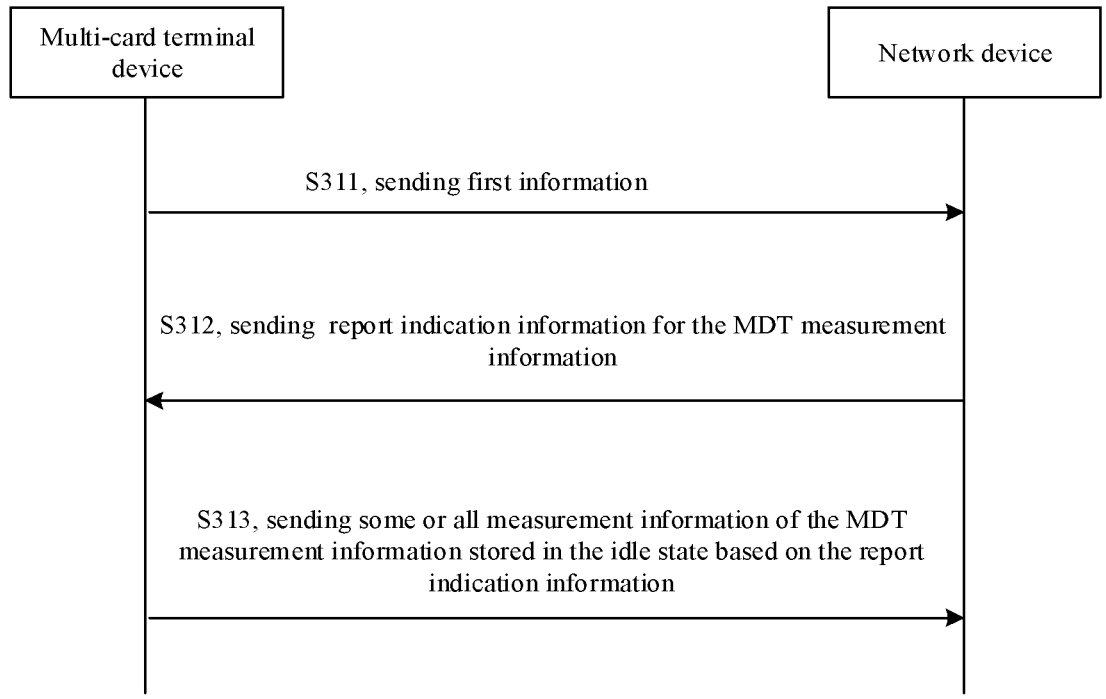
FIG. 4 is a sequence diagram of sending Minimization of Drive-Test (MDT) measurement information according to the embodiment of the disclosure.

Embodiments of the disclosure provide a specific implementation wherein a multi-card terminal device sends MDT measurement information determined in an idle state or in an inactive state, as shown in FIG. 4. FIG. 4 is a sequence diagram of sending the MDT measurement information according to an embodiment of the disclosure. As shown in FIG. 4, the specific implementation of sending the MDT measurement information provided by the embodiments of the disclosure may include the following steps.

At step S311, the multi-card terminal device sends first information.

In some possible implementations, in a process of establishing a communication connection with any network device, i.e., in response to entering a connected state from an idle state or an inactive state or entering an inactive state or a connected state from an idle state within a coverage area of any network device, the multi-card terminal device may send the first information to the network device by establishing or restoring a Radio Resource Control (RRC) signaling during the communication connection. The first information is configured to indicate that the multi-card terminal device has the MDT measurement information stored on the multi-card terminal device in the idle state.

The multi-card terminal device may send the first information to the network device via any RRC signaling involved in establishing or restoring the communication connection with the network device.

In a 4G network, the above RRC signaling includes, but is not limited to:
  an RRCConnectionSetupComplete signaling;
  an RRCConnectionReconfigurationComplete signaling;
  an RRCConnectionReestablishmentComplete signaling; and
  an RRCConnectionResumeComplete signaling.

In a 5G network, the above RRC signaling includes, but is not limited to:
  an RRCSetupComplete signaling;
  an RRCReconfigurationComplete signaling;
  an RRCReestablishmentComplete signaling; and
  an RRCResumeComplete signaling.

The specific signaling used by the multi-card terminal device to send the first information to the network device may be determined based on the actual application scenario, i.e., in the process of establishing a communication connection with the network device and entering into the connected state, the multi-card terminal device sends the first information to the network device via the signaling in the process of establishing the communication connection, which is not limited here.

At step S312, the network device sends report indication information for MDT measurement information.

In some possible implementations, the network device may send the report indication information to the multi-card terminal device, to cause the multi-card terminal device to send the MDT measurement information based on the report indication information. In some embodiments of the disclosure, the report indication information may be sent by the network device after the first information sent by the multi-card terminal device is received. In other embodiments of the disclosure, the report indication information may be sent by the network device in response to any trigger condition, or may be sent by the network device autonomously.

The report indication information sent by the network device may be used to instruct the multi-card terminal device to send all the MDT measurement information stored by the multi-card terminal device in the idle state.

Alternatively, to reduce resource transmission consumption and improve the transmission efficiency and data processing efficiency of the MDT measurement information, the network device uses the above indication information to instruct the multi-card terminal device to report the MDT measurement information required by the network device, such as, MDT measurement information related to paging collision, or MDT measurement information related to paging unresponsiveness.

Alternatively, the network device can instruct the multi-card terminal device to send the MDT measurement information within a specified time period based on the report indication information, or instruct the multi-card terminal device to send all the MDT information stored in the idle state, the specific contents indicated by the report indication information are not limited here.

The network device can send the report indication information to the multi-card terminal device via a UEInformationRequest signaling.

At step S323, the multi-card terminal device sends part or all of the measurement information of the MDT measurement information stored in the idle state based on the report indication information.

In some possible implementations, the report indication information may be indication information allowing the multi-card terminal device to report the MDT measurement information. The multi-card terminal device may, after receiving the report indication information, send the MDT measurement information specified in the report indication information to the network device, i.e., some or all of the measurement information of the MDT measurement information stored in the idle state is sent based on the report indication information.

The specific contents indicated in the above indication information may be determined based on actual application scenarios, such as, the MDT measurement information for paging collision, which is not limited here.

In detail, the multi-card terminal device may send some or all of the measurement information of the MDT measurement information stored in the idle state to the network device via a UEInformationResponse signaling.

Optionally, the MDT measurement information stored in the idle state and sent by the multi-card terminal device to the network device each time may be MDT measurement information indicated by the report indication information among the MDT measurement information stored by the multi-card terminal device during the MDT measurement performed during the idle time between a time point of previous sending the MDT measurement information and a current time point, or MDT measurement information indicated in the report indication information among the MDT measurement information stored by the multi-card terminal device and that has not been sent to the network device, which can be determined based on the actual settings of the multi-card terminal device and the instructions of the network device, which is not limited here.

Optionally, after sending the MDT measurement information stored in the idle state to the network device each time, the multi-card terminal device may delete the sent MDT measurement information, thereby avoiding repeatedly sending the same MDT measurement information when sending the MDT measurement information next time. The specific implementation of deleting the MDT measurement information stored by the multi-card terminal device in the idle state can be determined based on the actual configuration of the multi-card terminal device and the instructions of the network device, which is not limited herein.

In the embodiment of the disclosure, the above steps S311, S312, and S313 may be performed individually or in any combination, which is not limited in this embodiment of the disclosure.

Figure 5:
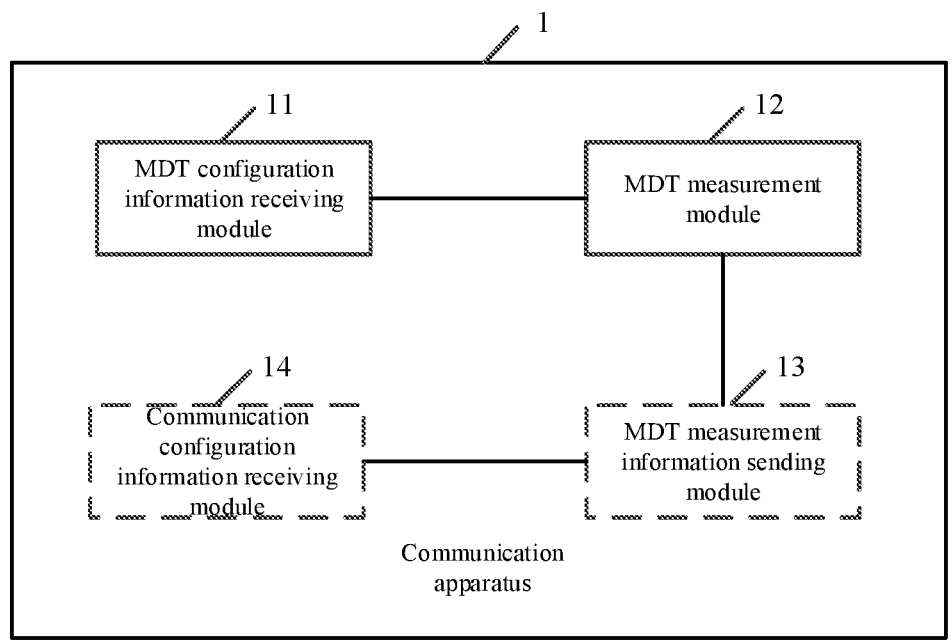
FIG. 5 is a block diagram of a communication apparatus according to an embodiment of the disclosure.

FIG. 5 is a block diagram of a communication apparatus 1 according to an embodiment of the disclosure. The communication apparatus 1 includes: a MDT configuration information receiving module 11 and a MDT measurement module 12.

The MDT configuration information receiving module 11 is configured to receive MDT configuration information for a multi-card terminal device sent by a first network device.

The MDT measurement module 12 is configured to, in response to the multi-card terminal device entering an idle state from a connected state, perform MDT measurement based on the MDT configuration information, and store obtained MDT measurement information.

In some possible implementations, the communication apparatus 1 further includes: a MDT measurement information sending module 13.

The MDT measurement information sending module 13 is configured to send the MDT measurement information stored in the idle state to a second network device.

In some possible implementations, the communication apparatus 1 further includes: a communication configuration information receiving module 14.

The communication configuration information receiving module 14 is configured to receive communication configuration information sent based on the received MDT measurement information by the second network device.

The communication configuration information receiving module 14 is configured to perform communication based on the communication configuration information.

In some possible implementations, the MDT measurement information sending module 13 is configured to:
send first information to the second network device, wherein the first information is configured to indicate that the multi-card terminal device has the MDT measurement information stored thereon in the idle state;
receive report indication information sent by the second network device for the stored MDT measurement information; and
send part of or all measurement information of the MDT measurement information stored in the idle state to the second network device based on the report indication information.

In some possible implementations, the MDT measurement information sending module 13 is configured to:
in response to the multi-card terminal device entering the connected state from the idle state, send the MDT measurement information stored in the idle state to the second network device.

In some possible implementations, the above MDT configuration information includes MDT configuration information corresponding to at least one SIM card.

In some possible implementations, the MDT configuration information includes at least one of:
an item for MDT measurement;
an event type that triggers storage of MDT;
information to be measured; or
measurement time.

In some possible implementations, the item includes at least one of paging collision, paging unresponsiveness, or an unresponsive service type.

In some possible implementations, the event type includes at least one of paging collision, paging unresponsiveness, or an unresponsive service type.

In some possible implementations, the information to be measured includes at least one of a radio access type, a frequency, or a cell.

In some possible implementations, the measurement time includes at least one of a measurement start time, a measurement end time, a measurement duration, or a measurement time interval.

In some possible implementations, the MDT configuration information is sent by the first network device via a LoggedMeasurementConfiguration signaling.

In some possible implementations, the MDT measurement information sending module 13 is configured to:
send the first information to the second network device via an RRC signaling.

In some possible implementations, the report indication information is sent by the second network device via a UEInformationRequest signaling.

In some possible implementations, the MDT measurement information sending module 13 is configured to:
send the MDT measurement information stored in the idle state to the second network device via a UEInformationResponse signaling.

Figure 6:
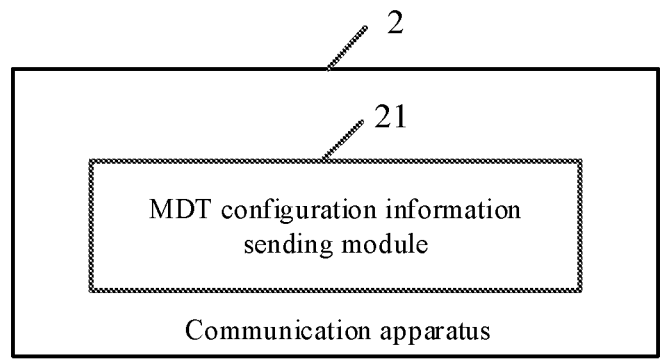
FIG. 6 is a block diagram of a communication apparatus according to another embodiment of the disclosure.

FIG. 6 is a block diagram of a communication apparatus according to another embodiment of the disclosure. The communication apparatus 2 includes: a MDT configuration information sending module 21.

The MDT configuration information sending module 21 is configured to send MDT configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information.

In some possible implementations, the MDT configuration information includes MDT configuration information corresponding to at least one SIM card.

In some possible implementations, the MDT configuration information includes at least one of:
an item for MDT measurement;
an event type that triggers storage of MDT;
information to be measured; or
measurement time.

In some possible implementations, the item includes at least one of paging collision, paging unresponsiveness, or an unresponsive service type.

In some possible implementations, the event type includes at least one of paging collision, paging unresponsiveness, or an unresponsive service type.

In some possible implementations, the information to be measured includes at least one of a radio access type, a frequency, or a cell.

In some possible implementations, the measurement time includes at least one of a measurement start time, a measurement end time, a measurement duration, or a measurement time interval.

In some possible implementations, the MDT configuration information sending module is configured to:
send the MDT configuration information for the above multi-card terminal device to the multi-card terminal device via a LoggedMeasurementConfiguration signaling.

Figure 7:
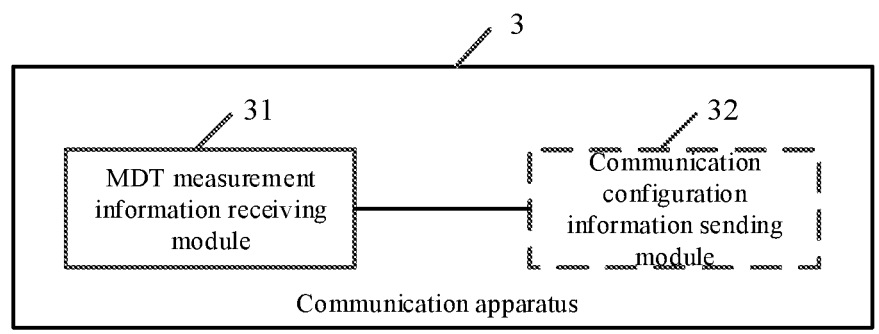
FIG. 7 is a block diagram of a communication apparatus according to yet another embodiment of the disclosure.

FIG. 7 is a block diagram of a communication apparatus according to yet another embodiment of the disclosure. The communication apparatus 3 includes: a MDT measurement information receiving module 31.

The MDT measurement information receiving module 31 is configured to receive MDT measurement information sent by a multi-card terminal device and stored in an idle state.

In some possible implementations, the communication apparatus 3 further includes: a communication configuration information sending module 32.

The communication configuration information sending module 32 is configured to send communication configuration information to the multi-card terminal device based on the MDT measurement information, for the multi-card terminal device to perform communication based on the communication configuration information.

In some possible implementations, the MDT measurement information receiving module 31 is configured to:
receive first information from the multi-card terminal device, wherein the first information is configured to indicate that the multi-card terminal device has the MDT measurement information stored thereon in the idle state; and
send report indication information for the stored MDT measurement information to the multi-card terminal device, for a multi-card user to send, based on the report indication information, some or all measurement information of the MDT measurement information stored in the idle state.

In some possible implementations, the MDT measurement information stored in the idle state is sent by the multi-card terminal device in response to the multi-card device entering a connected state from the idle state.

In some possible implementations, the first information is sent by the multi-card terminal device via an RRC signaling.

In some possible implementations, the MDT measurement information receiving module 31 is configured to:
sending the report indication information for the stored MDT measurement information to the multi-card terminal device via a UEInformationRequest signaling.

In some possible implementations, the MDT measurement information stored in the idle state is sent by the multi-card terminal device via a UEInformationResponse signaling.

In the embodiments of the disclosure, the network device may instruct the multi-card terminal device to perform the MDT measurement in accordance with the instructions through the MDT configuration information, to improve the efficiency of the MDT measurement of the multi-card terminal device. Further, the network device may obtain some or all of the MDT measurement information sent by the multi-card terminal device, and the multi-card terminal device may perform communication based on the communication configuration information sent based on some or all of the MDT measurement information by the network device, to improve the communication quality of the multi-card terminal device and improve the communication efficiency.

Figure 8:
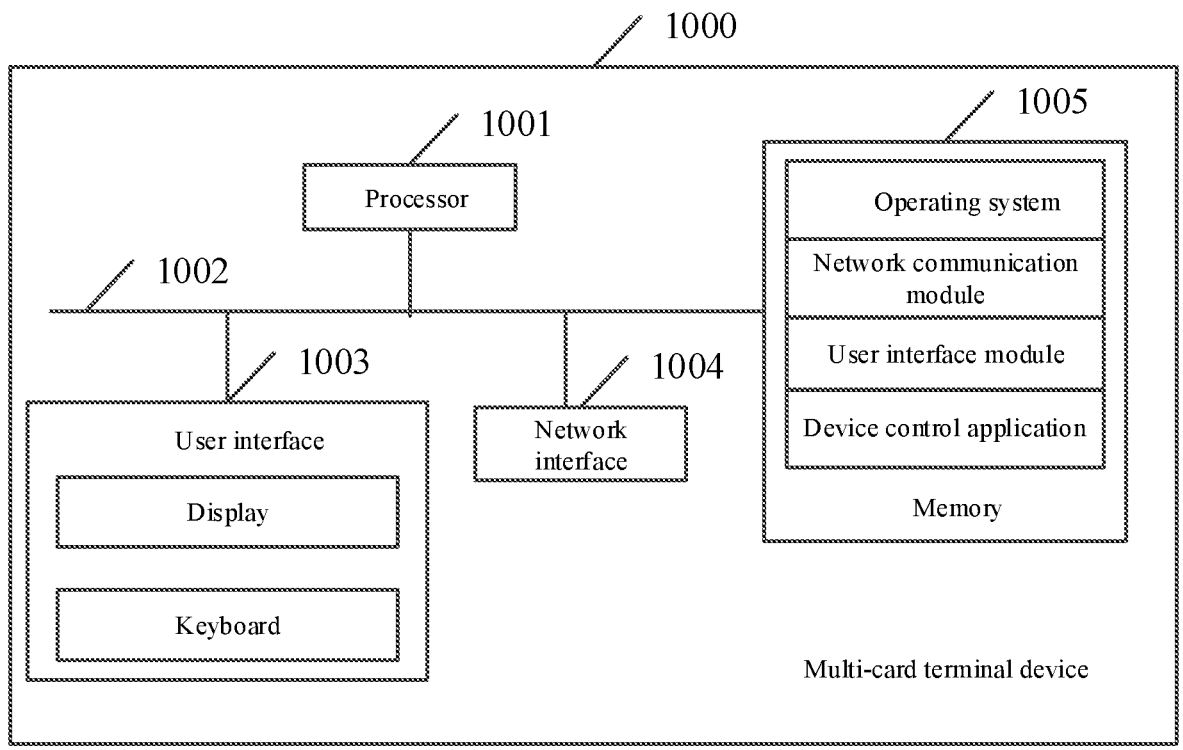
FIG. 8 is a schematic diagram of a multi-card terminal device according to an embodiment of the disclosure.

FIG. 8 is a schematic diagram of a multi-card terminal device according to an embodiment of the disclosure. As shown in FIG. 8, a multi-card terminal device 1000 in this embodiment may include: a processor 1001, a network interface 1004 and a memory 1005. In addition, the above multi-card terminal device 1000 may also include: a user interface 1003, and at least one communication bus 1002. The communication bus 1002 is configured to implement communication connections among these components. The user interface 1003 may include a display, and a keyboard. Optionally, the user interface 1003 may also include a standard wired interface, and a wireless interface. The network interface 1004 may include a standard wired interface, and a wireless interface (such as a WI-FI interface). Optionally, the memory 1004 may be a high-speed RAM memory, or a non-volatile memory, such as at least one disk memory. Optionally, the memory 1005 may also be at least one storage device located away from the above processor 1001. As shown in FIG. 8, as a computer readable storage medium, the memory 1005 may include an operating system, a network communication module, a user interface module, and a device control application.

In the multi-card terminal device 1000 shown in FIG. 8, the network interface 1004 may provide a network communication function. The user interface 1003 is mainly configured to provide an interface for user input. The processor 1001 may be configured to call the device control application stored in the memory 1005 to:
receive MDT configuration information for the multi-card terminal device sent by a first network device; and
in response to the multi-card terminal device entering an idle state from a connected state, perform MDT measurement based on the MDT configuration information, and store obtained MDT measurement information.

In some possible implementations, the processor 1001 is further configured to:
send the MDT measurement information stored in the idle state to a second network device.

In some possible implementations, the processor 1001 is further configured to:

receive communication configuration information sent based on the received MDT measurement information by the second network device; and perform communication based on the communication configuration information.

In some possible implementations, the processor 1001 is configured to:

send first information to the second network device, wherein the first information is configured to indicate that the multi-card terminal device has the MDT measurement information stored thereon in the idle state;

receive report indication information sent by the second network device in response to the stored MDT measurement information; and send some or all measurement information of the MDT measurement information stored in the idle state to the second network device based on the report indication information.

In some possible implementations, the processor 1001 is configured to:

in response to the multi-card terminal device entering the connected state from the idle state, send the MDT measurement information stored in the idle state to the second network device.

In some possible implementations, the above MDT configuration information includes MDT configuration information corresponding to at least one SIM card.

In some possible implementations, the MDT configuration information includes at least one of:

an item for MDT measurement;
an event type that triggers storage of MDT;
information to be measured; or
measurement time.

In some possible implementations, the item includes at least one of paging collision, paging unresponsiveness, or an unresponsive service type.

In some possible implementations, the event type includes at least one of paging collision, paging unresponsiveness, or an unresponsive service type.

In some possible implementations, the information to be measured includes at least one of a radio access type, a frequency, or a cell.

In some possible implementations, the measurement time includes at least one of a measurement start time, a measurement end time, a measurement duration, or a measurement time interval.

In some possible implementations, the MDT configuration information is sent by the first network device via a LoggedMeasurementConfiguration signaling.

In some possible implementations, the processor 1001 is r configured to:

send the first information to the second network device via an RRC signaling.

In some possible implementations, the report indication information is sent by the second network device via a UEInformationRequest signaling.

In some possible implementations, the processor 1001 is configured to:

send the MDT measurement information stored in the idle state to the second network device via a UEInformationResponse signaling.

It is understood that in some possible implementations, the processor 1001 may be a Central Processing Unit (CPU), a processor, a Digital Signal Processor (DSP), an Application Specific Integrated Circuit (ASIC), a Field-Programmable Gate Array (FPGA), or other programmable logic device, discrete gate or transistor logic device, or discrete hardware component. The general processor may be a microprocessor or any conventional processor. The memory may include a Read-Only Memory (ROM) and a Random Access Memory (RAM), and provides instructions and data to the processor. A portion of the memory may also include a non-volatile RAM. For example, the memory may also store information about device type.

Figure 9:
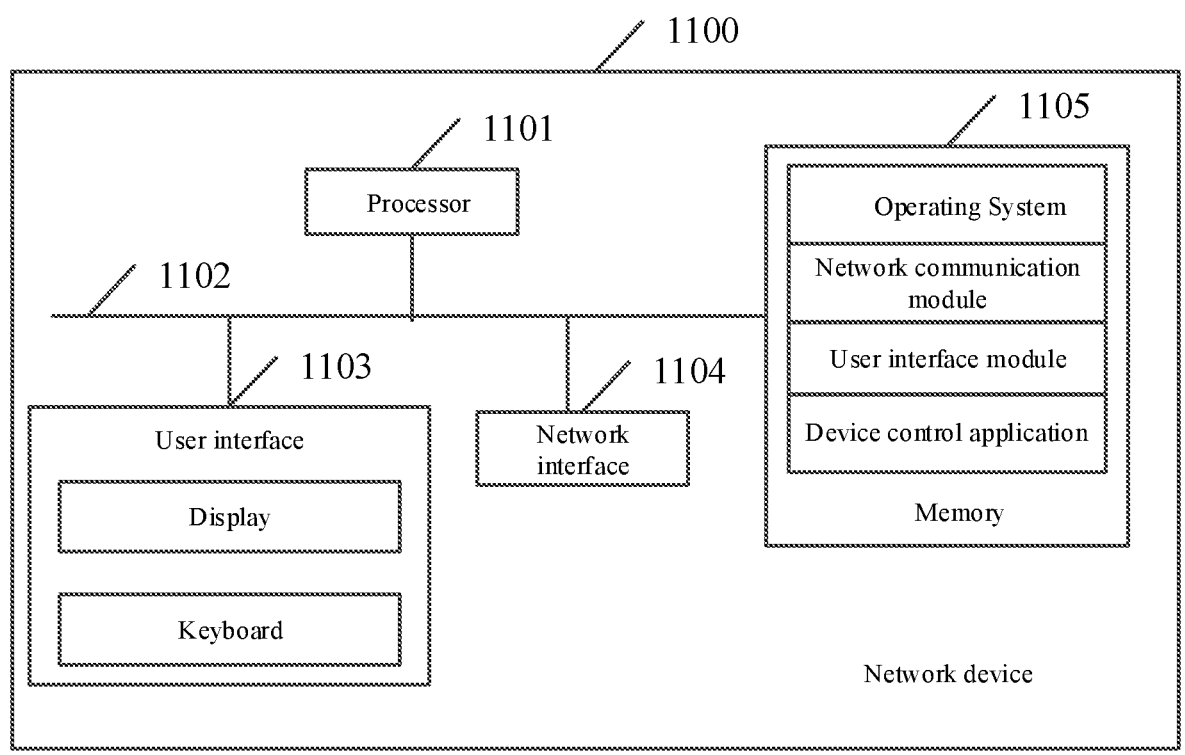
FIG. 9 is a schematic diagram of a network device according to an embodiment of the disclosure.

FIG. 9 is a schematic diagram of a network device according to an embodiment of the disclosure. As shown in FIG. 9, the network device 1100 in this embodiment may include: a processor 1101, a network interface 1104, and a memory 1105. In addition, the above network device 1100 may also include: a user interface 1103, and at least one communication bus 1102. The communication bus 1102 is configured to implement communication connections among these components. The user interface 1103 may include a display and a keyboard. Optionally, the user interface 1103 may also include a standard wired interface and a wireless interface. Optionally, the network interface 1104 may include a standard wired interface and a wireless interface (such as a WI-FI interface). The memory 1104 may be a high-speed RAM, or a non-volatile memory, such as at least one disk memory. Optionally, the memory 1105 may also be at least one storage device located away from the above processor 1101. As shown in FIG. 9, as a computer readable storage medium, the memory 1105 may include an operating system, a network communication module, a user interface module, and a device control application.

In the network device 1100 shown in FIG. 9, the network interface 1104 may provide a network communication function. The user interface 1103 is mainly configured to provide an interface for user input. The processor 1101 is configured to call the device control application stored in the memory 1105 to:

send MDT configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information.

In some possible implementations, the MDT configuration information includes MDT configuration information corresponding to at least one SIM card.

In some possible implementations, the MDT configuration information includes at least one of:

an item for MDT measurement;
an event type that triggers storage of MDT;
information to be measured; or
measurement time.

In some possible implementations, the item includes at least one of paging collision, paging unresponsiveness, or an unresponsive service type.

In some possible implementations, the event type includes at least one of paging collision, paging unresponsiveness, or an unresponsive service type.

In some possible implementations, the information to be measured includes at least one of a radio access type, a frequency, or a cell.

In some possible implementations, the measurement time includes at least one of a measurement start time, a measurement end time, a measurement duration, or a measurement time interval.

In some possible implementations, the processor 1101 is configured to:

send the MDT configuration information for the above multi-card terminal device to the multi-card terminal device via a LoggedMeasurementConfiguration signaling.

In some possible implementations, the processor 1101 is further configured to call the device control application stored in the memory 1105 to:

receive MDT measurement information sent by a multi-card terminal device and stored in an idle state.

In some possible implementations, the processor 1101 is further configured to:

send communication configuration information to the multi-card terminal device based on the MDT measurement information, for the multi-card terminal device to perform communication based on the communication configuration information.

In some possible implementations, the processor 1101 is further configured to:

receive first information from the multi-card terminal device, wherein the first information is configured to indicate that the multi-card terminal device has the MDT measurement information stored thereon in the idle state; and send report indication information for the stored MDT measurement information to the multi-card terminal device, for a multi-card user to send, based on the report indication information, some or all measurement information of the MDT measurement information stored in the idle state.

In some possible implementations, the MDT measurement information stored in the idle state is sent by the multi-card terminal device in response to the multi-card device entering a connected state from the idle state.

In some possible implementations, the first information is sent by the multi-card terminal device via an RRC signaling.

In some possible implementations, the processor 1101 is configured to:

send the report indication information for the stored MDT measurement information to the multi-card terminal device via a UEInformationRequest signaling.

In some possible implementations, the MDT measurement information stored in the idle state is sent by the multi-card terminal device via a UEInformationResponse signaling.

It is understood that in some possible implementations, the processor 1101 may be a CPU, a general processor, a DSP, an ASIC, a FPGA, or other programmable logic device, discrete gate or transistor logic device, or discrete hardware component. The general processor may be a microprocessor or any conventional processor. The memory may include a ROM and a RAM, and provides instructions and data to the processor. A portion of the memory may also include a non-volatile RAM. For example, the memory may also store information about device type.

In this embodiment, the network device may instruct the multi-card terminal device to perform the MDT measurement in accordance with the instructions through the MDT configuration information, to improve the efficiency of the MDT measurement of the multi-card terminal device. The network device may obtain some or all of the MDT measurement information sent by the multi-card terminal device, and the multi-card terminal device may perform communication according to the communication configuration information sent based on some or all of the MDT measurement information by the network device, to improve the communication quality of the multi-card terminal device and improve the communication efficiency.

The embodiments of the disclosure also provide a computer-readable storage medium having computer programs stored thereon. When the computer programs are executed by a processor, the methods provided in various steps of the embodiments of the disclosure are implemented, as can be seen in the implementations provided in the various steps described above, which will not be repeated herein.

The computer-readable storage medium described above may be an internal storage unit, a hard disk or a memory of the communication device provided in any of the preceding embodiments. The computer readable storage medium may also be an external storage device, such as a plug-in hard disk, a Smart Media Card (SMC), a Secure Digital (SD) card, and a flash card. The above computer readable storage medium may also include a disk, a CD, a ROM or a RAM. Further, the computer-readable storage medium can also include both an internal storage unit and an external storage device. The computer readable storage medium is configured to store the computer programs and other programs and data. The computer readable storage medium is configured to temporarily store data that has been output or will be output.

The embodiments of the disclosure provide a computer program product or a computer program. The computer program product or computer program includes computer instructions, the computer instructions are stored in the computer readable storage medium. The processor reads the computer instructions from the computer readable storage medium, and executes the computer instructions, so that the computer device performs the method provided in the various steps of embodiments of the disclosure.

The terms "first" and "second" in the claims, the specification, and the accompanying drawings of this disclosure are used to distinguish different objects and are not intended to describe a particular order. In addition, the terms "includes" and "comprises" and any variations thereof are intended to cover non-exclusive inclusion. For example, the terms include a process, a method, a system, a product, or a device that includes a series of steps or units but is not limited to the listed steps or units. Optionally, the terms also include steps or units that are not listed, or other steps or units that are inherent to those processes, methods, products, or devices. The "embodiments" in the disclosure mean that particular features, structures, or characteristics described in combination with the embodiments may be included in at least one embodiment of the disclosure. The term used in every location of the disclosure may not refer to the same embodiment, nor is it a separate or alternative embodiment that is mutually exclusive with other embodiments. It is understood, both explicitly and implicitly, by those skilled in the art that the embodiments described herein may be combined with other embodiments. The term "and/or" as used in this specification and the appended claims refers to any and all possible combinations of one or more relevant items listed, and includes such combinations.

Those skilled in the art may realize that the units and algorithmic steps of each example described in combination with the embodiments disclosed herein can be implemented by an electronic hardware, a computer software, or a combination of both. In order to clearly illustrate the interchangeability of hardware and software, the components and steps of each example have been described in general terms by function in the above description. Those skilled in the art may use different methods to implement the described functions for each particular application, but such implementations should not be considered as beyond the scope of this disclosure.

The embodiments described above are only preferential embodiments of the disclosure, and cannot be used to limit the scope of right of the disclosure. Therefore, equivalent variations made in accordance with the claims of the disclosure are still covered by the disclosure.

In an embodiment, a communication method, performed by a multi-card terminal device, includes:
  receiving, Minimization of Drive-Test MDT configuration information for the multi-card terminal device sent by a first network device; and
  in response to the multi-card terminal device entering an idle state from a connected state, performing MDT measurement based on the MDT configuration information, and storing obtained MDT measurement information.

In an embodiment, the communication method further includes:
  sending the MDT measurement information stored in the idle state to a second network device.

In an embodiment, the communication method further includes:
  receiving communication configuration information sent based on the received MDT measurement information by the second network device; and
  performing communication based on the communication configuration information.

In an embodiment, sending the MDT measurement information stored in the idle state to the second network device includes:
  sending first information to the second network device, wherein the first information is configured to indicate that the multi-card terminal device has the MDT measurement information stored thereon in the idle state;
  receiving report indication information sent by the second network device for the stored MDT measurement information; and
  sending part of or all measurement information of the MDT measurement information stored in the idle state to the second network device based on the report indication information.

In an embodiment, sending the MDT measurement information stored in the idle state to the second network device includes:
  in response to the multi-card terminal device entering the connected state from the idle state, sending the MDT measurement information stored in the idle state to the second network device.

In an embodiment, the MDT configuration information includes MDT configuration information corresponding to at least one Subscriber Identity Module SIM card.

In an embodiment, the MDT configuration information includes at least one of:
  an item for MDT measurement;
  an event type that triggers storage of MDT;
  information to be measured; or
  measurement time.

In an embodiment, the item includes at least one of paging collision, paging unresponsiveness, or an unresponsive service type.

In an embodiment, the event type includes at least one of paging collision, paging unresponsiveness, or an unresponsive service type.

In an embodiment, the information to be measured includes at least one of a radio access type, frequency, or a cell.

In an embodiment, the measurement time includes at least one of a measurement start time, a measurement end time, a measurement duration, or a measurement time interval.

In an embodiment, the MDT configuration information is sent by the first network device via a LoggedMeasurementConfiguration signaling.

In an embodiment, sending the first information to the second network device includes:
  sending the first information to the second network device via a Radio Resource Control RRC signaling.

In an embodiment, the report indication information is sent by the second network device via a UEInformationRequest signaling.

In an embodiment, sending the MDT measurement information stored in the idle state to the second network device includes:
  sending the MDT measurement information stored in the idle state to the second network device via a UEInformationResponse signaling.

In an embodiment, a communication method, performed by a network device, includes:
  sending MDT configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information.

In an embodiment, the MDT configuration information includes MDT configuration information corresponding to at least one SIM card.

In an embodiment, the MDT configuration information includes at least one of:
  an item for MDT measurement;
  an event type that triggers storage of MDT;
  information to be measured; or
  measurement time.

In an embodiment, the item includes at least one of paging collision, paging unresponsiveness, or an unresponsive service type.

In an embodiment, the event type includes at least one of paging collision, paging unresponsiveness, or an unresponsive service type.

In an embodiment, the information to be measured includes at least one of a radio access type, a frequency, or a cell.

In an embodiment, the measurement time includes at least one of a measurement start time, a measurement end time, a measurement duration, or a measurement time interval.

In an embodiment, sending the MDT configuration information for the multi-card terminal device to the multi-card terminal device, includes:
  sending the MDT configuration information for the multi-card terminal device to the multi-card terminal device via a LoggedMeasurementConfiguration signaling.

In an embodiment, a communication method, performed by a network device, includes:
  receiving MDT measurement information sent by a multi-card terminal device and stored in an idle state.

In an embodiment, the communication method further includes:
  sending communication configuration information to the multi-card terminal device based on the MDT measurement information, for the multi-card terminal device to perform communication based on the communication configuration information.

In an embodiment, receiving the MDT measurement information stored in the idle state sent by the multi-card terminal device includes:

receiving first information sent by the multi-card terminal device, wherein the first information is configured to indicate that the multi-card terminal device has the MDT measurement information stored thereon in the idle state; and sending report indication information for the stored MDT measurement information to the multi-card terminal device, for a multi-card user to send, based on the report indication information, some or all measurement information of the MDT measurement information stored in the idle state.

In an embodiment, the MDT measurement information stored in the idle state is sent by the multi-card terminal device in response to the multi-card device entering a connected state from the idle state.

In an embodiment, the first information is sent by the multi-card terminal device via an RRC signaling.

In an embodiment, sending the report indication information for the stored MDT measurement information to the multi-card terminal device includes:

sending the report indication information for the stored MDT measurement information to the multi-card terminal device via a UEInformationRequest signaling.

In an embodiment, the MDT measurement information stored in the idle state is sent by the multi-card terminal device via a UEInformationResponse signaling.

In an embodiment, a communication apparatus, includes:
a MDT configuration information receiving module, configured to receive Minimization of Drive-Test MDT configuration information for a multi-card terminal device sent by a first network device; and
a MDT measurement module, configured to, in response to the multi-card terminal device entering an idle state from a connected state, perform MDT measurement based on the MDT configuration information, and store obtained MDT measurement information.

In an embodiment, a communication apparatus, includes:
a MDT configuration information sending module, configured to send MDT configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information.

In an embodiment, a communication apparatus, includes:
a MDT measurement information receiving module, configured to receive MDT measurement information sent by a multi-card terminal device and stored in an idle state.

In an embodiment, a multi-card terminal device, includes a processor and a memory. The processor and the memory are interconnected;

the memory is configured to store computer programs; and the processor is configured to implement the communication method according to any one of above embodiments when calling the computer programs.

In an embodiment, a network device, includes a processor and a memory. The processor and the memory are interconnected;

the memory is configured to store computer programs; and the processor is configured to implement the communication method according to any one of above embodiments, when calling the computer programs.

In an embodiment, a computer readable storage medium has computer programs stored thereon. When the computer programs are executed by a processor, the communication method of any one of the above embodiment is implemented.

The invention claimed is:

1. A communication method, performed by a multi-card terminal device, comprising:

receiving Minimization of Drive-Test (MDT) configuration information for the multi-card terminal device sent by a first network device; and in response to the multi-card terminal device entering an idle state from a connected state, performing MDT measurement based on the MDT configuration information, and storing obtained MDT measurement information;

wherein the MDT configuration information comprises at least one of:

an item for MDT measurement, wherein the item comprises at least one of paging collision, paging unresponsiveness, or an unresponsive service type;

an event type that triggers storage of MDT, wherein the event type comprises at least one of paging collision, paging unresponsiveness, or an unresponsive service type;

information to be measured, wherein the information to be measured comprises at least one of a radio access type, frequency, or a cell; or measurement time, wherein the measurement time comprises at least one of a measurement start time, a measurement end time, a measurement duration, or a measurement time interval.

2. The method of claim 1, further comprising:
sending the MDT measurement information stored in the idle state to a second network device.

3. The method of claim 2, further comprising:
receiving communication configuration information sent based on the received MDT measurement information by the second network device; and
performing communication based on the communication configuration information.

4. The method of claim 2, wherein sending the MDT measurement information stored in the idle state to the second network device comprises at least one of:

sending first information to the second network device, wherein the first information is configured to indicate that the multi-card terminal device has the MDT measurement information stored thereon in the idle state;

receiving report indication information sent by the second network device for the stored MDT measurement information; and sending part of or all measurement information of the MDT measurement information stored in the idle state to the second network device based on the report indication information;

or, in response to the multi-card terminal device entering the connected state from the idle state, sending the MDT measurement information stored in the idle state to the second network device.

5. The method of claim 4, wherein sending the first information to the second network device comprises:
sending the first information to the second network device via a Radio Resource Control RRC signaling.

6. The method of claim 2, wherein sending the MDT measurement information stored in the idle state to the second network device comprises:
  sending the MDT measurement information stored in the idle state to the second network device via a UEInformationResponse signaling.

7. The method of claim 1, wherein the MDT configuration information comprises MDT configuration information corresponding to at least one Subscriber Identity Module (SIM) card.

8. The method of claim 1, wherein the MDT configuration information is sent by the first network device via a LoggedMeasurementConfiguration signaling.

9. A communication method, performed by a network device, comprising:
  sending Minimization of Drive-Test (MDT) configuration information for a multi-card terminal device to the multi-card terminal device, wherein the MDT configuration information is used by the multi-card terminal device, in response to the multi-card terminal device entering an idle state from a connected state, to perform MDT measurement and store obtained MDT measurement information;
  wherein the MDT configuration information comprises at least one of:
  an item for MDT measurement, wherein the item comprises at least one of paging collision, paging unresponsiveness, or an unresponsive service type;
  an event type that triggers storage of MDT, wherein the event type comprises at least one of paging collision, paging unresponsiveness, or an unresponsive service type;
  information to be measured, wherein the information to be measured comprises at least one of a radio access type, frequency, or a cell; or
  measurement time, wherein the measurement time comprises at least one of a measurement start time, a measurement end time, a measurement duration, or a measurement time interval.

10. The method of claim 9, wherein the MDT configuration information comprises MDT configuration information corresponding to at least one SIM card.

11. The method of claim 9, wherein sending the MDT configuration information for the multi-card terminal device to the multi-card terminal device, comprises:
  sending the MDT configuration information for the multi-card terminal device to the multi-card terminal device via a LoggedMeasurementConfiguration signaling.

12. A communication method, performed by a network device, comprising:
  receiving Minimization of Drive-Test (MDT) measurement information sent by a multi-card terminal device and stored in an idle state;
  wherein the MDT configuration information comprises at least one of:
  an item for MDT measurement, wherein the item comprises at least one of paging collision, paging unresponsiveness, or an unresponsive service type;
  an event type that triggers storage of MDT, wherein the event type comprises at least one of paging collision, paging unresponsiveness, or an unresponsive service type;
  information to be measured, wherein the information to be measured comprises at least one of a radio access type, frequency, or a cell; or
  measurement time, wherein the measurement time comprises at least one of a measurement start time, a measurement end time, a measurement duration, or a measurement time interval.

13. The method of claim 12, further comprising:
  sending communication configuration information to the multi-card terminal device based on the MDT measurement information, for the multi-card terminal device to perform communication based on the communication configuration information.

14. The method of claim 12, wherein receiving the MDT measurement information stored in the idle state sent by the multi-card terminal device comprises:
  receiving first information sent by the multi-card terminal device, wherein the first information is configured to indicate that the multi-card terminal device has the MDT measurement information stored thereon in the idle state; and
  sending report indication information for the stored MDT measurement information to the multi-card terminal device, for a multi-card user to send, based on the report indication information, some or all measurement information of the MDT measurement information stored in the idle state.

15. The method of claim 14, wherein sending the report indication information for the stored MDT measurement information to the multi-card terminal device comprises:
  sending the report indication information for the stored MDT measurement information to the multi-card terminal device via a UEInformationRequest signaling.

16. The method of claim 12, wherein the MDT measurement information stored in the idle state is sent by the multi-card terminal device in response to the multi-card device entering a connected state from the idle state.

* * * * *